(12) United States Patent
Fischer et al.

(10) Patent No.: US 8,307,692 B2
(45) Date of Patent: Nov. 13, 2012

(54) CALIBRATION OF DUST LOAD FLOW MEASURING SYSTEMS

(75) Inventors: Norbert Fischer, Lichtenberg (DE); Frank Hannemann, Freiberg (DE); Günter Tietze, Freiberg (DE)

(73) Assignee: Siemens Aktiengesellschaft, München (DE)

( * ) Notice: Subject to any disclaimer, the term of this patent is extended or adjusted under 35 U.S.C. 154(b) by 301 days.

(21) Appl. No.: 12/595,914

(22) PCT Filed: Jun. 25, 2008

(86) PCT No.: PCT/EP2008/058059
§ 371 (c)(1),
(2), (4) Date: Oct. 14, 2009

(87) PCT Pub. No.: WO2009/037009
PCT Pub. Date: Mar. 26, 2009

(65) Prior Publication Data
US 2010/0162788 A1    Jul. 1, 2010

(30) Foreign Application Priority Data
Sep. 14, 2007   (DE) .......................... 10 2007 043 907

(51) Int. Cl.
*G01F 25/00* (2006.01)

(52) U.S. Cl. .......................................... 73/1.35; 73/1.16
(58) Field of Classification Search ................... 73/1.35, 73/1.16
See application file for complete search history.

(56) References Cited

U.S. PATENT DOCUMENTS

| 4,483,199 A | * | 11/1984 | Beiermann et al. | ........ 73/861.04 |
| 4,490,077 A | | 12/1984 | Shimada et al. | |
| 4,529,336 A | * | 7/1985 | Shinozaki et al. | ............. 406/14 |
| 4,663,799 A | * | 5/1987 | Kiyooka | .......................... 15/330 |
| 4,838,738 A | | 6/1989 | Salter et al. | |

FOREIGN PATENT DOCUMENTS

| EP | 0 454 230 A2 | 10/1991 |
| EP | 0 786 648 A1 | 7/1997 |

* cited by examiner

*Primary Examiner* — Hezron E Williams
*Assistant Examiner* — Nashmiya Fayyaz

(57) ABSTRACT

A method for calibrating a dust load flow measuring system is provided. The dust delivery line may be connected from a metering vessel to a calibration line leading to the input sluice in the delivery direction downstream of the installed dust load flow measuring device instead of to the gasification reactor. The input sluice is provided with a weighing unit such that the weight of the content of the input sluice is determined. A differential pressure that may be set is controlled between the metering vessel and the input sluice, the dust load flow is determined in a time interval.

12 Claims, 1 Drawing Sheet

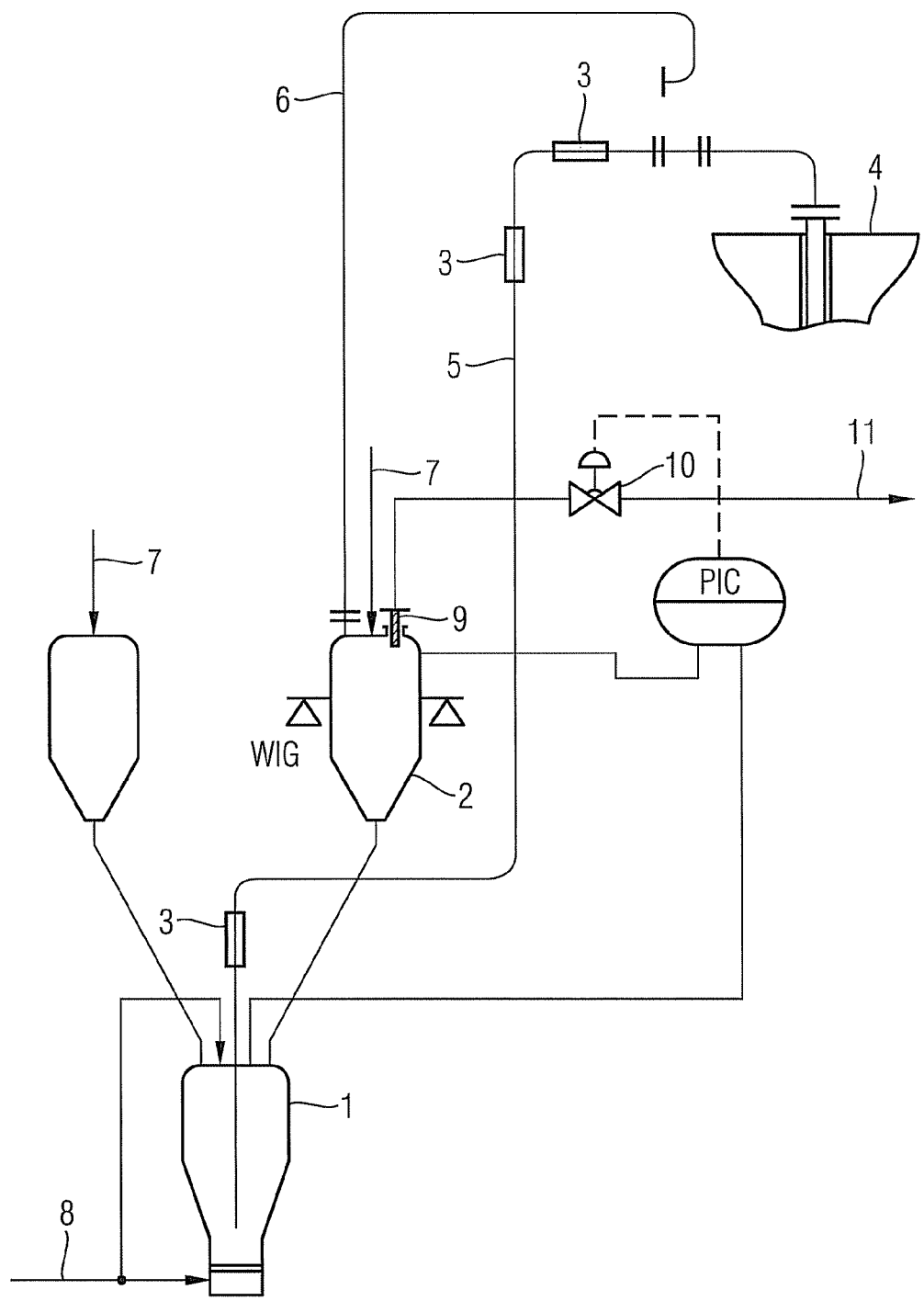

CALIBRATION OF DUST LOAD FLOW MEASURING SYSTEMS

CROSS REFERENCE TO RELATED APPLICATIONS

This application is the US National Stage of International Application No. PCT/EP2008/058059, filed Jun. 25, 2008 and claims the benefit thereof. The International Application claims the benefits of German application No. 10 2007 043 907.7 DE filed Sep. 14, 2007, both of the applications are incorporated by reference herein in their entirety.

FIELD OF INVENTION

The subject matter of the application relates to a method for calibrating a dust load flow measuring system having the features of the claims.

BACKGROUND OF INVENTION

In gasification units, the fuel quantity supplied to the gasification reactor is detected very accurately using measurement techniques. This also applies in particular to pressurized coal dust gasification units with pneumatically operating dust input systems. Prior to the initial operation of such units, functional tests and calibration experiments of the dust load flow measuring system used are needed. These examinations are to be repeated at certain time intervals as well as after long service interruptions. The implementation of such tests and examinations under as near on-site conditions as possible is desirable. Continuous plausibility checks of the dust load flow measuring systems are also expedient during the gasification operation in order to promptly detect the gradual drift of the measuring systems.

Apparatuses for implementing the necessary functional tests and calibrations using separate weighing containers are also known. Delivery takes place here from the metering vessel of the dust input system into a weighing container mounted on weighing cells.

The realization of on-site delivery conditions with operating pressures above 4 MPa (40 bar) as well as sufficiently long experiment times are nevertheless very complicated here. The setting-up of several weighing containers can generally not be avoided for multiple strand gasification units.

It is conventional for the plausibility check of determined measured values for the dust throughput to use the differential pressure between the metering vessel and the reactor. This procedure nevertheless only then supplies useable results if no changeable flow obstacles (e.g. control fittings) are contained in the dust delivery lines and as narrow a range of delivery density as possible is ensured. This method may also prove unusable or only useable to a restricted degree in the case of a change in the coal quality or in the case of a change in the granularity parameters and/or the humidity content of the gasification dust. This is disadvantageous in that measured values have to be used for the plausibility check of the dust load flow measurement, said measured values also being fed into the dust load flow measurement.

SUMMARY OF INVENTION

The problem underlying the invention is to create a method for calibrating a dust load flow measuring system for a pulverized coal gasification facility, which provides greater accuracy during the gasification operation.

The problem is solved by a method as claimed in the claims.

The invention includes the use of one of several already necessary input sluices of the dust input system as receiving containers for the delivery experiments needed during functional tests and calibrations of the dust load flow measuring technology.

To this end, the input sluice provided herefor is provided with weighing cells WG. Precautions for a complete force-related decoupling of the relevant input sluices in the steel structure are also to be taken for the implementation of calibrations. To dissipate the delivery gas from the sluice, a suitable filter facility is also provided, which permits the dedusting of the delivery gas to be dissipated under pressurized conditions. The dedusted delivery gas is dissipated by way of a control valve, which can be used at the same time to control the differential pressure between the metering container and the receiving container/sluice. The operating pressure in the metering vessel is kept constant in this case. Alternatively, a constant absolute pressure control can also take place in the receiver container/sluice and the differential pressure control is realized by way of a controlled gas supply and/or dissipation in and/or out of the metering vessel. The control needed herefor is already needed for the initial operation of the system.

An additional inventive feature consists in the previously conventionally used plausibility control of the dust load flow measurement during gasification operation by means of the evaluation of the differential pressure between the metering vessel and the reactor being augmented or replaced by a carbon balance by way of the gasification process.

The invention uses one of the already necessary input sluices of the dust input system as a receiving container during delivery experiments, which are inevitable during functional tests and for the calibration of the dust load flow measuring systems in the gasification units with pneumatically operating dust input systems.

The advantages are that necessary functional tests and calibration experiments in dust input systems of gasification units can be carried out with only minor additional effort under on-site delivery conditions and with sufficiently long experiment durations.

In the case of plausibility checks of the dust load flow measurements during gasification operation, effects from interfering variables, which act on the pressure loss in the delivery lines, are reduced and/or ruled out by a carbon balancing being included by way of the gasification reactor. This relates to variables such as modified delivery conditions (flow speed; delivery density), modifiable flow obstacles (e.g. control fittings) or carbon dust parameters (humidity, granularity structure, true density etc.).

BRIEF DESCRIPTION OF THE DRAWINGS

The invention is described in more detail below as an exemplary embodiment, with reference to a FIGURE and to a degree required for understanding, in which;

FIG. 1 shows an exemplary embodiment for the implementation of functional tests of the dust delivery and calibrations of the dust load flow measuring technology in the dust input system of a gasification unit.

DETAILED DESCRIPTION OF INVENTION

Pressurized fuel dust (7) and delivery gas supply (8) are delivered to the metering vessel as shown by the direction of the arrows. The dust delivery line (5) leading from the metering vessel (1) to the gasification reactor (4) is, in connection with the installed dust load flow measuring and monitoring technology (3), linked around the calibration line (6) leading to an input sluice (2). Instead of the gasification reactor, the dust delivery line (5) can therefore be connected in the delivery direction downstream of the installed dust load flow measuring and monitoring technology (3) to the calibration line (6) leading to the input sluice (2). This input sluice (2) is provided with weighing cells and is arranged decoupled in a force-related fashion in the steel structure. The input sluice for implementing the tests with a filter facility (9) is also equipped to dedust the delivery gas (11) to be dissipated under pressurized conditions of 4 MPa (40 bar) for instance. The dedusted delivery gas is dissipated by way of a differential pressure control (10) between the metering vessel and the input sluice. The metering vessel operates here at a constant operating pressure. The dust load flow aimed for in the respective test is adjusted by varying the differential pressure between the metering vessel and input sluice. This takes place in a similar fashion to adjusting the dust load flow in the gasification operation by controlling the differential pressure between the metering vessel and the gasification reactor.

The dust delivery as well as the dust load flow measuring and monitoring technology can be tested and calibrated in the described manner in all the dust delivery lines of a gasification unit.

After emptying the dust content of the input sluice (2) into the metering vessel (1), the tests can be repeated as often as necessary.

The invention claimed is:

1. A method for testing and calibrating a dust load flow measuring system, comprising:
   using an input sluice as a receiving container;
   providing a dust delivery line leading from a metering vessel to a gasification reactor;
   during the testing and calibrating:
     disconnecting the dust delivery line from the gasification reactor in a delivery direction downstream of an installed dust load flow measuring technology;
     connecting the dust delivery line to a calibration line connected to the input sluice in a delivery direction downstream of the installed dust load flow measuring technology;
     providing the input sluice with a weighing facility, such that a load of a content of the input sluice containing pressurized fuel dust is determined;
     controlling a first differential pressure between the metering vessel and the input sluice to a predetermined value using a pressure control valve; and
     determining a dust load flow in a time interval using the first differential pressure and a change in the load in the input sluice,
   wherein when the calibration line is connected, the pressurized fuel dust flows from the metering vessel through the delivery line into the calibration line and into the input sluice.

2. The method as claimed in claim 1, further comprising after the determining:
   the dust delivery line is disconnected from the calibration line,
   reconnecting the dust delivery line to the gasification reactor in the delivery direction downstream of the installed dust load flow measuring technology,
   wherein the determined dust load flow is delivered into the gasification reactor according to a second differential pressure between the metering vessel and the gasification reactor, and
   wherein the second differential pressure is controlled using the pressure control valve.

3. The method as claimed in claim 1, wherein an operating pressure in the metering vessel is kept constant.

4. The method as claimed in claim 3, wherein the first differential pressure occurs by controlling a dissipation of delivery gas from the input sluice.

5. The method as claimed in claim 4, wherein the dissipated delivery gas is filtered out of the input sluice.

6. The method as claimed in claim 5,
   wherein the delivery gas is dissipated using the pressure control valve, and
   wherein the pressure control valve also controls the first differential pressure at a same time as the delivery gas is dissipated.

7. The method as claimed in claim 1, wherein a constant absolute pressure is regulated in the receiving container.

8. The method as claimed in claim 7, wherein the first differential pressure is regulated using a delivery gas supply and/or a discharge in and/or out of the metering vessel.

9. The method as claimed in claim 2, wherein during a gasification operation, an exceeding of a deviation between the dust load flow delivered according to the second differential pressure and a carbon balance is evaluated using the gasification reactor.

10. The method as claimed in claim 1, wherein the method is used for a pulverized coal gasification facility.

11. The method as claimed in claim 1, wherein the dust load flow is adjusted by varying the first differential pressure between the metering vessel and the input sluice.

12. The method as claimed in claim 2, wherein the dust load flow is adjusted by varying the second differential pressure between the metering vessel and the gasification reactor.

* * * * *